United States Patent
El-Helw et al.

(10) Patent No.: US 7,668,804 B1
(45) Date of Patent: Feb. 23, 2010

(54) RECOMMENDING STATISTICAL VIEWS USING COST/BENEFIT METRICS

(75) Inventors: Amr El-Helw, Waterloo (CA); Ihab Ilyas, Waterloo (CA); Calisto P. Zuzarte, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/264,878

(22) Filed: Nov. 4, 2008

(51) Int. Cl.
*G06F 7/00* (2006.01)
*G06F 17/30* (2006.01)

(52) U.S. Cl. .............................................. 707/2; 707/1
(58) Field of Classification Search ........................ None
See application file for complete search history.

(56) References Cited

U.S. PATENT DOCUMENTS

| | | | |
|---|---|---|---|
| 5,404,510 A * | 4/1995 | Smith et al. ..................... | 707/2 |
| 6,223,171 B1 | 4/2001 | Chaudhuri et al. | |
| 6,266,658 B1 * | 7/2001 | Adya et al. ..................... | 707/2 |
| 6,480,836 B1 * | 11/2002 | Colby et al. ................... | 707/3 |
| 6,493,699 B2 | 12/2002 | Colby et al. | |
| 6,513,029 B1 | 1/2003 | Agrawal et al. | |
| 7,007,006 B2 | 2/2006 | Zilio et al. | |
| 2003/0084025 A1 | 5/2003 | Zuzarte | |
| 2005/0050041 A1 | 3/2005 | Galindo-Legaria | |
| 2005/0091208 A1 | 4/2005 | Larson et al. | |
| 2005/0187917 A1 | 8/2005 | Lawande et al. | |
| 2006/0184338 A1 * | 8/2006 | Lightstone et al. .......... | 702/182 |
| 2007/0220058 A1 | 9/2007 | Kandil et al. | |
| 2008/0172354 A1 | 7/2008 | Zuzarte et al. | |
| 2008/0189243 A1 | 8/2008 | Li et al. | |

OTHER PUBLICATIONS

Bruno, N., et al., "Conditional Selectivity for Statistics on Query Expressions," Proc. of ACM SIGMOD Int'l. Conf. on Management of Data, 2004, pp. 311-322, Jun. 13-18, 2004.

Chaudhuri, S., et al., "An Efficient, Cost-Driven Index Selection Tool for Microsoft SQL Server," Proc. of 23rd Very Large Databases Conf., pp. 146-155, 1997.

Bruno, N., et al., "Exploiting Statistics on Query Expressions for Optimization," Proc. of ACM SIGMOD Int'l. Conf. on Management of Data, pp. 263-274, 2002.

(Continued)

*Primary Examiner*—James K. Trujillo
*Assistant Examiner*—Marc Somers
(74) *Attorney, Agent, or Firm*—Patents on Demand, P.A.; Brian K. Buchheit

(57) ABSTRACT

A workload to be handled by a database system can be identified. The workload can include at least one query that the database system is to handle. A set of at least one candidate statistical views (statviews) to be utilized when optimizing the workload can be enumerated. A benefit value and a cost value of the each of the enumerated candidate statistical views relative to the entire workload can be computed. The cost value can reflect a cost of constructing and collecting statistics on the associated statistical view. A set of the candidate views most beneficial for handling the workload can be determined based upon the computed benefit values and computed cost values. A generalization phase that augments the candidate view set with higher value candidate views for consideration during the recommendation phase. The optimum subset of views from the determined set of candidate views can be recommended, which can cause them to be constructed and utilized by a database optimizer.

9 Claims, 5 Drawing Sheets

OTHER PUBLICATIONS

Agrawal, S., et al., "Automated Selection of Materialized Views and Indexes for SQL Databases," Proc. of 26th Int'l. Conf. on Very Large Databases, pp. 496-505, 2000.

Larson, P., et al., "Cardinality Estimation Using Sample Views with Quality Assurance," Proc. of 2007 ACM SIGMOD Conf. on Management of Data, pp. 175-186, 2007.

Zilio, D., et al., "DB2 Design Advisor: Integrated Automatic Physical Database Design," Proc. of 30th Int'l. Conf. on Very Large Databases, vol. 30, pp. 1087-1097, 2004.

Zaharioudakis, M., et al., "Answering complex SQL queries using automatic summary tables," ACM SIGMOD Record, vol. 29, No. 2, pp. 105-116, 2000.

Bruno, N., et al., "Conditional Selectivity for Statistics on Query Expressions," Proc. of ACM SIGMOD Int'l. Conf. on Management of Data, 2004, pp. 311-322, Jun. 13-18, 2004.

Chaudhuri, S., et al., "An Efficient, Cost-Driven Index Selection Tool for Microsoft SQL Server," Proc. of 23rd Very Large Databases Conf., pp. 146-155, 1997.

Bruno, N., et al., "Exploiting Statistics on Query Expressions for Optimization," Proc. of ACM SIGMOD Int'l. Conf. on Management of Data, pp. 263-274, 2002.

Agrawal, S., et al., "Automated Selection of Materialized Views and Indexes for SQL Databases," Proc. of 26th Intl. Conf. on Very Large Databases, pp. 496-505, 2000.

* cited by examiner

Sample Candidate Enumeration 410

Sample Query 412

SELECT * FROM A, B, C
　WHERE A.a1 = B.b1
　AND B.b2 = C.c2
　AND A.a2>10 AND A.a3=100
　AND (B.b1<50 OR B.b1>500)
　AND C.c1=0

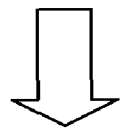

Candidate Table 414

| | | |
|---|---|---|
| $M_1 = A$ | $v_1$: | SELECT A.a1 FROM A<br>WHERE A.a2>10 AND A.a3=100 |
| $M_2 = B$ | $v_2$: | SELECT B.b1 FROM B<br>WHERE B.b1>50 OR B.b1>500 |
| $M_3 = C$ | $v_3$: | SELECT C.c2 FROM C<br>WHERE C.c1=0 |
| $M_4 = AB$ | $v_4$: | SELECT B.b2 FROM A, B<br>WHERE A.a1=B.b1<br>AND A.a2>10 AND A.a3=100<br>AND (B.b1<50 OR B.b1>500) |
| $M_5 = BC$ | $v_5$: | SELECT B.b2 FROM B, C<br>WHERE B.b2=C.c2<br>AND (B.b1<50 OR B.b1>500)<br>AND C.c1=0 |
| $M_6 = ABC$ | $v_6$: | SELECT 1 FROM A, B, C<br>WHERE A.a1=B.b1<br>AND B.b2=C.c2<br>AND A.a2>10 AND A.a3=100<br>AND (B.b1<50 OR B.b1>500)<br>AND C.c1=0 |

FIG. 4A

Sample Benefit Equations 420

$B_0(v, Q) = cost(Q) - cost_v(Q)$  422

$B_1(v, Q) = estcost(P, v) - estcost(P_v, v)$  424

$B_2(v, Q) = Card\ Err(v) * RemOp(v, Q)$  426

$$CardErr_{est}(v) = \Delta rej \cdot \prod_{l=1}^{K} Card(T_l)$$  428

Sample Cost Equation 440

$C(v_j) = t_j * freq_j$

FIG. 4B

```
V1:    SELECT OID FROM Owner, Car
       WHERE OID = Car.OwnerID
       AND Country='US'
       AND Price*(1-Discount)<5000

V2:    SELECT OID FROM Owner, Car
       WHERE OID = Car.OwnerID
       AND Country='US'
       AND Price*(1-Discount)>10000

V3:    SELECT OID FROM Owner, Car
       WHERE OID = Car.OwnerID
       AND Price*(1-Discount)<5000

V12:   SELECT OID,Price*(1-Discount)
       FROM Owner, Car
       WHERE OID = Car.OwnerID
       AND Country='US'

V13:   SELECT OID,Country
       FROM Owner, Car
       WHERE OID = Car.OwnerID
       AND Price*(1-Discount)<5000
```
450

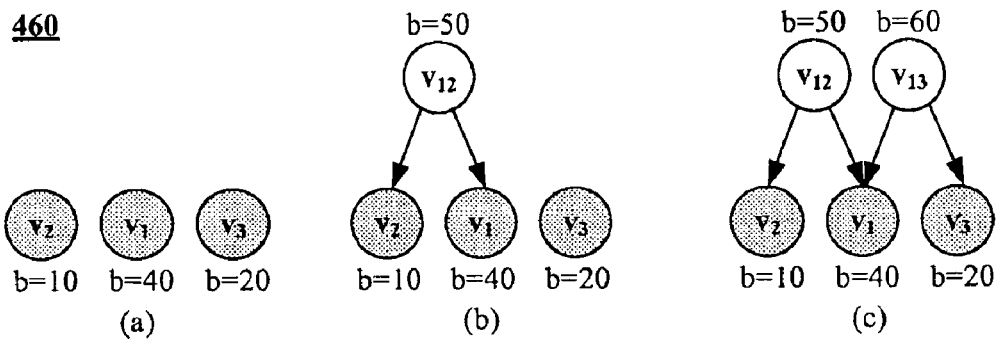
460

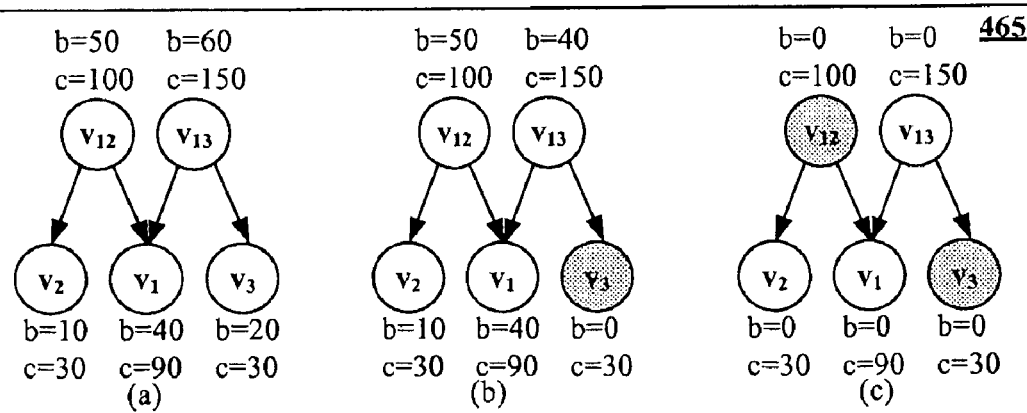
465

FIG. 4C

RECOMMENDING STATISTICAL VIEWS USING COST/BENEFIT METRICS

BACKGROUND OF THE INVENTION

The present invention relates to the field of database optimizing and, more particularly, to automatically recommending statistical views (statviews) using cost/benefit metrics for improved intermediate result estimations during query optimization operations.

A query optimizer is the component of a database management system that attempts to determine the most efficient way to execute a query. The optimizer considers the possible query plans for a given input query, and attempts to determine which of those plans will be the most efficient. Cost-based query optimizers assign an estimated cost to each possible query plan, and choose the plan with the smallest cost. The set of query plans can be formed by examining the possible access paths (e.g. index scan, sequential scan) and join algorithms (e.g. sort-merge join, hash join, nested loops).

The performance of a query plan is determined largely by the order in which the tables are joined. For example, when joining three tables A, B, C of size 10 rows, 1,000,000 rows, and 1,000,000 rows, respectively, a query plan that joins B and C first can take several orders-of-magnitude more time to execute than one that joins A and C first. Joining A and C first could have the advantage of a smaller size result that can in turn be joined to B more efficiently than if we were to join the two big tables first. Most query optimizers determine join order via a dynamic programming algorithm, although other optimization algorithms exist and can be utilized.

Cost-based query optimizers rely on a cost model to choose the best possible query plan for a given query. The accuracy of cost estimates can directly affect the quality of the query plan. That is, when costs estimates are inaccurate, non-efficient plans can be selected over more efficient ones, which can significantly affect query performance. Cost estimates depend mainly on cardinality estimations of various sub-plans (intermediate results) generated during optimization.

Statistics that capture the logical characteristics and physical layout of the data are important to cost based optimizers for accurately estimating the execution cost of the access plans. Logical characteristics can include, but are not limited to, the sizes of the tables, the number of distinct values in a column of a table, the frequency and histogram statistics that capture the distribution of the data values in the columns, and the like. Physical characteristics can include, but are not limited to, the clustering and the number of pages that a table or index occupies.

Using basic statistics on base tables requires adopting unrealistic assumptions to estimate the cardinalities of intermediate results, which usually cause large estimation errors that can be off by several orders of magnitude. For example, the basic statistics might give the optimizer the information about the individual columns but may not capture correlation of values in one column with the values in another column. Modern commercial database systems support statistical or sample views, which give more accurate statistics on intermediate results and query sub-expressions. There is currently no mechanism to automatically recommend the most beneficial statistical views to construct for estimating intermediate results during query optimization operations.

BRIEF DESCRIPTION OF THE SEVERAL VIEWS OF THE DRAWINGS

FIG. 4A is a diagram showing a sample candidate enumeration in accordance with an embodiment of the inventive arrangements disclosed herein.

FIG. 4B is a diagram showing a sample set of cost and benefit equations for statviews in accordance with an embodiment of the inventive arrangements disclosed herein.

FIG. 4C is a diagram showing a sample view generalization and selection process in accordance with an embodiment of the inventive arrangements disclosed herein.

DETAILED DESCRIPTION OF THE INVENTION

Figure 1:
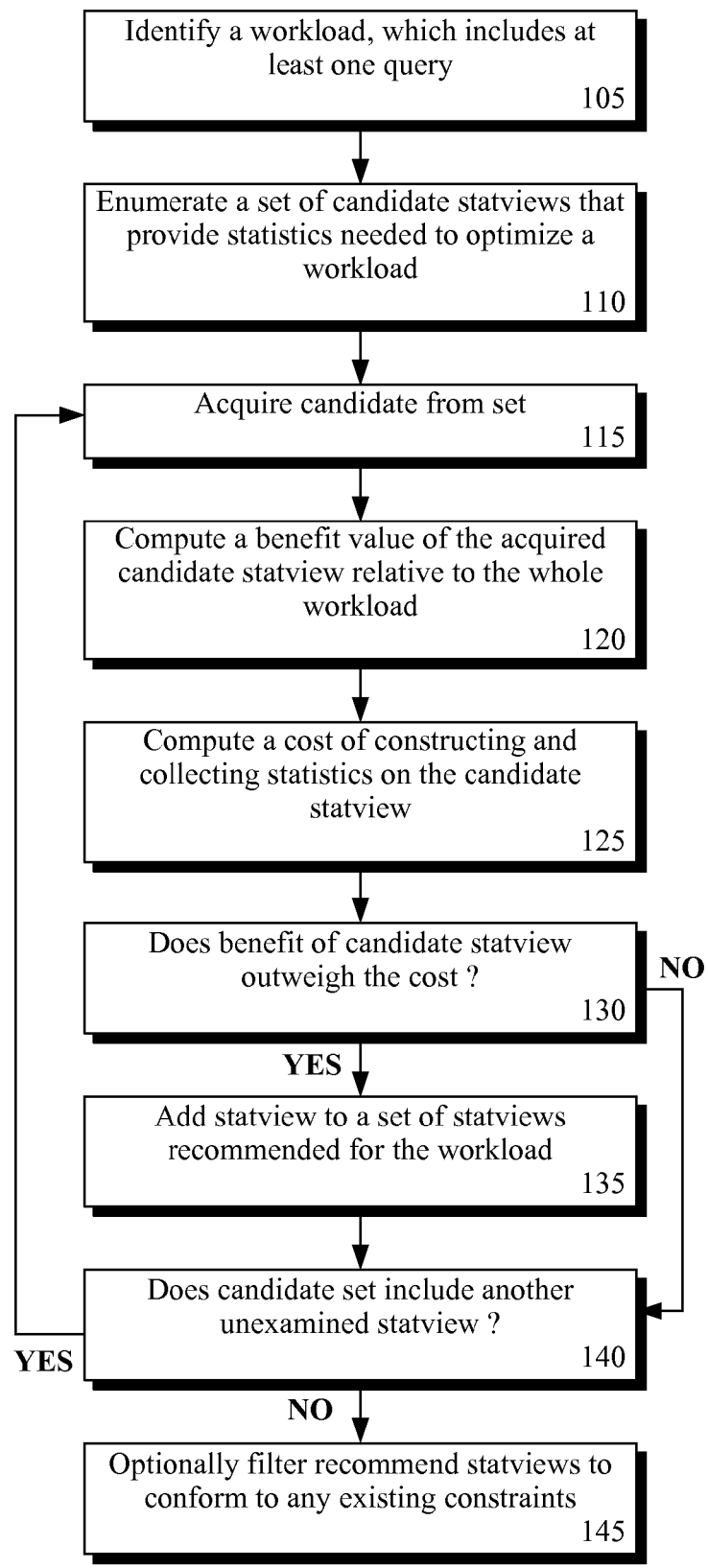
FIG. 1 is a flow chart of a method for selecting recommended statistical views (statviews) based upon results of cost/benefit calculation in accordance with an embodiment of the inventive arrangements disclosed herein.

The present solution automatically recommends statistical views (statviews) that improve an accuracy of cost estimates during database optimization operations, which in turn improves performance of the database. In the solution, a set of candidate statviews are analyzed. For each candidate statview, a benefit value generated across a whole workload for that candidate is generated, as is a cost associated with constructing a statview for the candidate. When the benefit exceeds the cost, the candidate can be added to a set of statviews used by an optimizer. Otherwise, no statview for that candidate can be constructed.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable storage medium may be utilized. The computer-usable or computer-readable storage medium may be, for example but not limited to, an electronic, magnetic, optical, electromagnetic, infrared, or semiconductor system, apparatus, or device. Examples of a computer-readable storage medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a flow chart of a method 100 for selecting recommended statistical views (statviews) based upon results of cost/benefit calculation in accordance with an embodiment of the inventive arrangements disclosed herein. The statviews can be views used by a database to accurately estimate a cost for performing database operations, such as intermediate operations of a query plan. Improved cost estimation accuracy ensures that a most optimal query path will be selected more often than otherwise. Selecting a more optimal query path for executing queries improves database performance. Method 100 recognizes the costs associated with constructing and collecting statistics on the candidate statviews and compares this cost to expected benefit resulting from the statview. Minimum and maximum thresholds and constraints can be imposed on the statview recommendations.

The method 100 can begin in step 105, where a workload can be identified that includes at least one query. In step 110, a set of candidate statviews can be enumerated, where each candidate provides statistics needed to optimize the workload. In step 115, a candidate can be acquired from the set. In step 120, a benefit value of the acquired candidate statview can be computed relative to the whole workload. In step 125, a cost of constructing and collecting statistics on the candidate statview can be computed.

In step 130, a determination can be made as to whether the benefit of the candidate statview outweighs the cost. If the benefit outweighs the cost, step 135 can execute, which adds the candidate statview to a set of statviews recommended for the workload. When the benefit doesn't outweigh the cost, the method can progress from step 130 to step 140. In step 140, if the candidate set includes an unexamined statview, the method can loop from step 140 to step 115, where a previously unexamined statview can be acquired from the set. When all candidate statviews have been analyzed, the method 100 can proceed to step 145, where the added statviews can be optionally filtered to accommodate any constraints imposed on the method. For example, if a constraint is placed on a maximum number of statviews and if the current set of statviews exceeds this limit, the filter to remove a number of statviews providing the least benefit verses cost relative to other ones of the recommended set so that the maximum statview constraint is no longer exceeded.

In more mathematical terms, the workload of step 105 can be expressed as: $W=\{Q_1; Q_2; \ldots ; Q_n\}$, where $Q_i$ is a query. Method constraints of $c_{max}$ and $n_{max}$ can be defined, where $n_{max}$ is the maximum number of views to recommend and $c_{max}$ is the maximum costs of collecting statistics on the recommended views. Method 100 can find a set of statviews $V=\{v_1; v_2; \ldots ; v_k\}$ such that for $1<=j<=k$, $v_j$ provides statistics needed to optimize W. The set of statviews V should be configured to provide the maximum benefit to the workload W while minimizing the cost and satisfying the user constraints (e.g., $cost(v_j)<=c_{max}$ and $k<=n_{max}$). For each statview $v_j$, $B(v_j)$ can be calculated, which is the benefit of $v_j$ for the whole workload, as shown in step 120. Also, C(v$_j$) which is the cost of constructing and collecting statistics on v$_j$, can be calculated, as shown by step 125. A set of most beneficial statviews (given the constraints) can be determined based upon the costs and benefit metrics.

Figure 2:
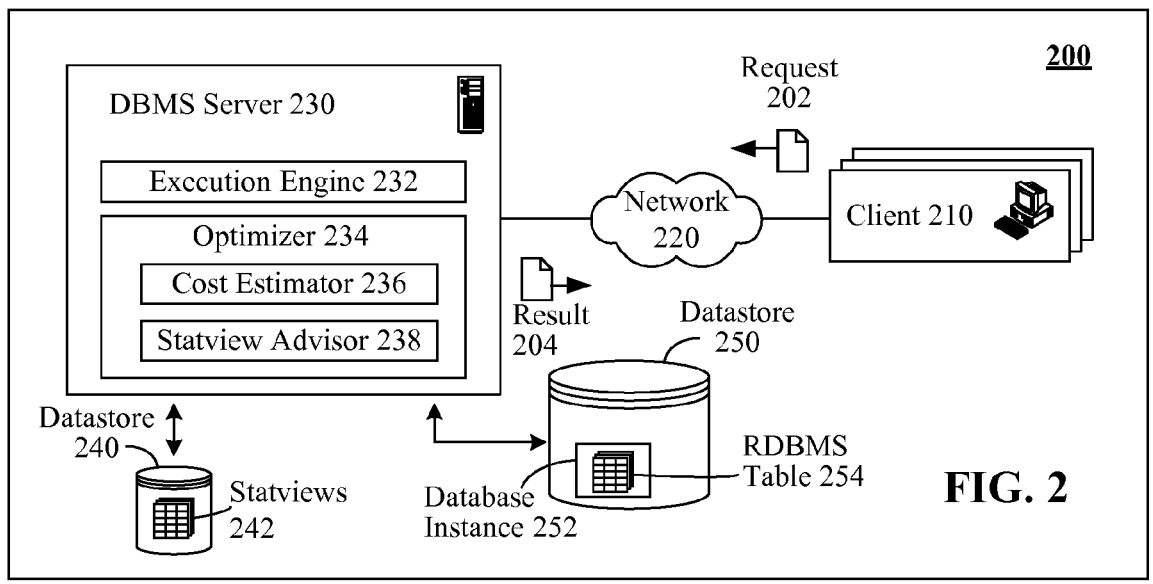
FIG. 2 is a schematic diagram of a system where statviews can be recommended based upon cost benefit metrics to optimize database performance.

FIG. 2 is a schematic diagram of a system 200 where statviews can be recommended based upon cost benefit metrics to optimize database performance. In system 200, a database server 230 can be connected to a set of clients 210 via a network 220. The clients 220 can issue requests 202, which the database server 230 processes using a database engine based upon digitally encoded content maintained in a storage medium, such as storage medium 250, which maintains database instance(s) 252, relational database management system (RDBMS) tables 254, views, procedures, and the like. The processing can include processing of standardized database expressions (e.g., Structured Queried Language (SOL)), which produce result 204, which is conveyed back to a requesting client 210. Multiple queries 202 can be concurrently handled. A set of queries pending for database management system (DBMS) server 230 at any point in time can be considered a workload being handled by the DBMS server 230.

When server 230 executes a query 202, an optimizer 234 can create a set of query paths for handling the query 202. The different query paths can have multiple intermediate steps. A cost estimator 236 can assign a cost per each step of each query path. Thus, a cost estimate can be established for each query path and a query path having the least cost can be executed by execution engine 232. Cost estimator 236 can utilize a set of statviews 242 to improve estimate accuracy. The statviews 242 can be dynamically and automatically created and populated with statistics needed for estimating costs. The statview advisor 238 can recommend a set of statviews 242 based upon expected benefit, costs, and a set of imposed constraints. In one embodiment, the statview advisor 238 can programmatically perform processes analogous to the steps shown in method 100.

As used herein, DBMS server 230 can include any set of computing devices (physical or virtual) that are capable of hosting a database engine. For example, the DBMS server 230 can include a distributed set of physical servers, which are clustered or otherwise interconnected. The DBMS server 230 can also reside on a single physical machine. The DBMS server 230 can include an operating system upon which the database engine executes.

The database engine can be a computer program product that stores, retrieves, and queries a set of related records. Database engine can be a relational database management (RDBMS) program. The database engine can receive an execute structured query language (SQL) commands, procedural commands, and the like. The database engine can include, but is not limited to, a DB2 engine, an INFORMIX engine, an ORACLE engine, a MYSQL engine, and the like.

The client 210 can be any computing device capable of issuing requests 202 and receiving responses 204. Client 210 can include a set of applications, which interact with a database backend (server 230). Further, client 210 can include a browser, which renders content from a Web server (not shown), which in turn utilizes server 230 to handle back-end database processing. Client 210 can include, but is not limited to a personal computer, a mainframe computer, a kiosk, a personal data assistant, a mobile phone, a networked media playing device, a gaming device, a navigation device, and the like.

Network 220 can include any hardware/software/and firmware necessary to convey digital content encoded within carrier waves. Content can be contained within analog or digital signals and conveyed through data or voice channels and can be conveyed over a personal area network (PAN) or a wide area network (WAN). The network 220 can include local components and data pathways necessary for communications to be exchanged among computing device components and between integrated device components and peripheral devices. The network 220 can also include network equipment, such as routers, data lines, hubs, and intermediary servers which together form a packet-based network, such as the Internet or an intranet. The network 220 can further include circuit-based communication components and mobile communication components, such as telephony switches, modems, cellular communication towers, and the like. The network 220 can include line based and/or wireless communication pathways.

Data stores 240 and 250 can be physically implemented within any type of hardware including, but not limited to, a magnetic disk, an optical disk, a semiconductor memory, a digitally encoded plastic memory, a holographic memory, or any other recording medium. The data stores 240 and 250 can be a stand-alone storage unit as well as a storage unit formed from a set of physical devices, which may be remotely located from one another.

Figure 3:
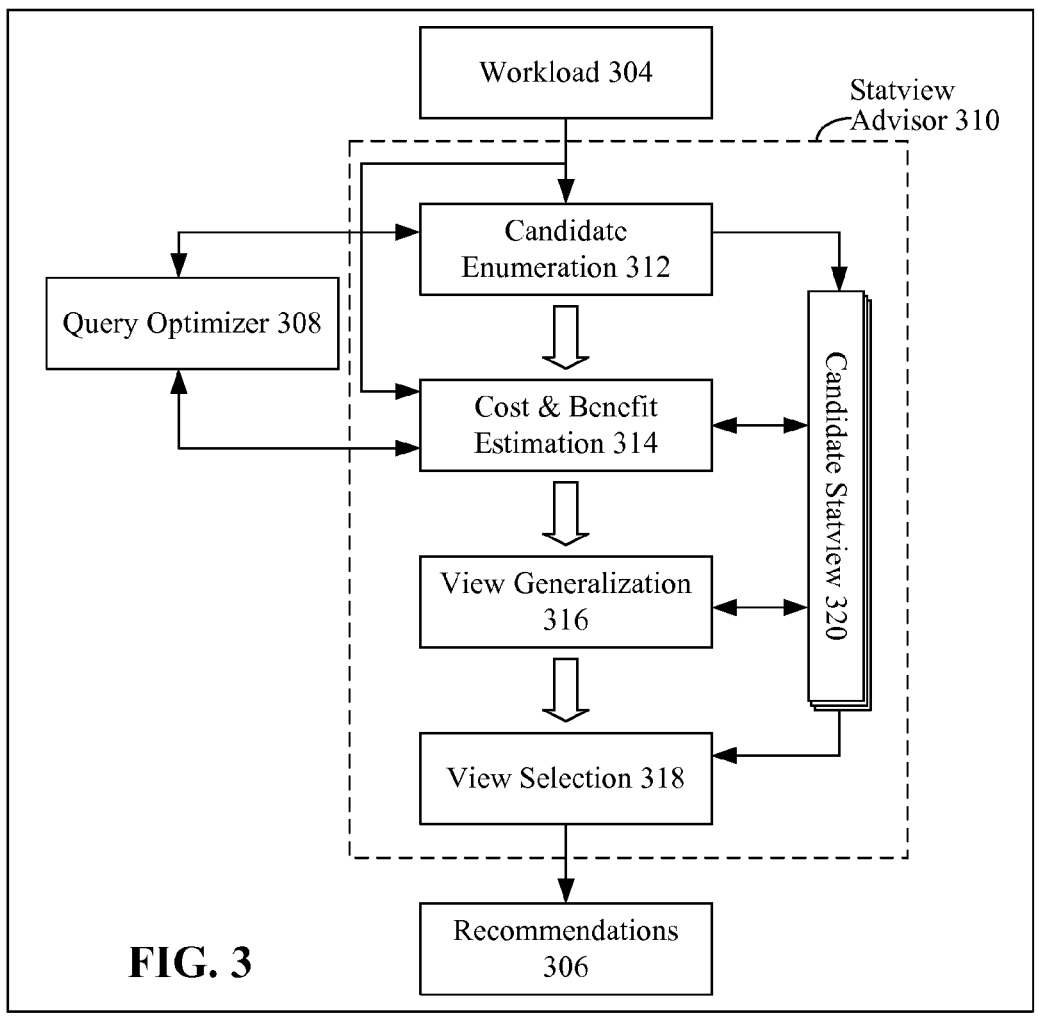
FIG. 3 is a schematic diagram depicting one contemplated framework of a statview advisor.

FIG. 3 is a schematic diagram depicting one contemplated framework of a statview advisor 310, such as advisor 238 of FIG. 2. As shown, the statview advisor can include a candidate enumeration module 312, a cost and benefit estimation module 314, a view generalization module 316, and a view selection module 318. During processing, candidate statview 320 can be stored within a temporary storage medium.

More specifically, the candidate enumeration module 312 can start by analyzing a set of queries of workload 304. Module 312 can generates a list of candidate statviews that can benefit each query individually. Advisor 310 can utilize cost and benefit estimation module 314 to determine cost/benefit metrics for each candidate statview 320. In one embodiment, the cost and benefit estimation module 314 can exploit other system components, such as the query optimizer 308 and its costing functions in order to come up with cost and benefit estimates for each candidate statview 320. The view generalization module 316 can examine the candidate list 320 and can generate more candidates by suggesting views that can be used by multiple queries. The view selection module 318 can chooses a subset of the candidate list 320 (e.g., recommendations 306) that maximizes the benefit/cost ratio while satisfying predefined constraints (e.g., $n_{max}$ and $c_{max}$).

Candidate enumeration module 312 can be a software component able to analyze queries of a workload 304 and to produce a candidate list 320 based upon this analysis. Candidate enumeration module 312 can utilize any optimization approach, which includes, but is not limited to, a dynamic programming approach upon which examples presented herein. It should be noted that collecting candidate statviews can be an optimizer-dependent problem since selected candidates are based on knowing specifics of how the optimizer 308 uses statistics to optimize a given query.

In one embodiment, query optimizer 308 can be a bottom-up optimizer that generates plans that transform an n-way join into a sequence of two-way joins using binary join operators. Optimizer 308 can process the non-redundant sets of table join combinations. For example, for a query Q=(A join B join C), the optimizer 308 can maintain following entries: {A; B; C; AB; BC; ABC}, assuming that A and C cannot be joined directly discounting Cartesian joins. The candidate statistical view set will contain the corresponding definitions for each of the partial queries that contain the relevancy, local, and join predicates appropriate for the partial queries.

The entries that are maintained (assuming a dynamic programming approach) are stored in a memory-resident structure, sometimes called a MEMO. The MEMO can hold non-pruned plans. Each MEMO entry corresponds to a subset of the tables (and applicable predicates) in the query. In other words, the logical expression corresponding to each MEMO entry is considered a candidate statview 320 item.

Stating functions of the enumeration module 312 in a mathematical context: module 312 can generate (for a query Q) a candidate statview $v_i$ for each MEMO entry $M_i$ enumerated by the optimizer 308. The candidate statview $v_i$ can be specified as follows:

1. the FROM clause of $v_i$ has the tables in $M_i$;
2. the WHERE clause of $v_i$ has all predicates from Q that reference only tables from $M_i$; and
3. the SELECT clause of $v_i$ has all the columns (or expressions) that are used in join predicates in Q to join tables from $M_i$ with tables not in $M_i$. In addition, the enumeration module 312 can generate candidate statviews 320 to include any columns (or expressions) on the tables in $M_i$ that are used in the GROUP BY clause of Q. If no columns fall under these categories, a single dummy column can be included.

A sample candidate enumeration 410 is shown in FIG. 4A. As shown, a sample query 412 can be used to generate a set of candidate statviews 320 shown in candidate table 414 along with their corresponding MEMO entries. It should be noted that MEMO entry $M_6$ represents the single dummy column noted above.

Enumeration module 312 can optionally perform heuristic pruning. Heuristic pruning performs early pruning of all candidate statviews 320 to remove those that are unlikely to benefit the workload 304. Heuristic rules applied when pruning can include, but are not limited to, data independence vs. correlation rule(s), uniform vs. skewed data rule(s), data inclusion rule(s), and existing structure based rule(s).

Data independence vs. correlation rule(s) apply when optimizer 308 assumes data independence when estimating cardinalities. Hence, statviews with independent predicates are of little importance since they add little value and can be pruned. Data correlation or independence can be detected using tools such as Correlated Data Streaming (CORDS) tools.

Regarding uniform vs. skewed data rule(s), data skew can be estimated by a suitable skew estimator for example by computing the Gini coefficient of the join columns. The Gini coefficient can be a measure of statistical dispersion defined as a ratio between 0 and 1. The numerator is the area between the Lorenz curve of the distribution and the uniform distribution line; the denominator is the area under the uniform distribution line. A high Gini coefficient can indicates a skewed distribution. In one embodiment, the Gini coefficient G can be computed using the frequency distribution information of the column in question. If G is lower than some predefined threshold, the associated statview can be eliminated.

Regarding data inclusion rule(s), consider joining two tables $T_1$ and $T_2$, where the corresponding join columns are $c_1$ and $c_2$, respectively. The inclusion concept assumes that if the number of distinct values in $c_1$ is less than the number of distinct values in $c_2$, then all the values in c1 are present in $c_2$ (and vice versa). Existing statistics (high and low values, as well as histograms) can be used to determine the actual overlap between the values in the join columns. If the overlap is above a certain threshold (i.e. one almost includes all the values in the other), the statview can be discarded.

Regarding existing structure based rule(s), existing statistics, indexes, and even statviews can be situationally used to prune the candidate list. For example, a candidate statview 320 can be pruned if it already exists in the system, or if there are other structures (e.g. histograms, indexes, etc.) that can provide effectively the same information as the statview in question.

The cost and benefit estimation module 314 can determine a cost and a benefit associated with each candidate statview 320 in context of the workload 304. Costs calculated by module 314 refers to a time and processing resources needed to create the statview, to collect statistics for the statview, and/or to maintain the statview throughout the workload. Although many database costs are related to memory space consumed, statviews do not contain actual data and, therefore, consume an insignificant amount of space.

Sample cost equation 440 of FIG. 4B shows one algorithm that module 314 can utilize to compute cost. In equation 440, $t_j$ represents the time required to refresh the statistics on $v_j$. Variable $freq_j$ can represent the required update frequency for $v_j$ (i.e., the number of times $v_j$ has to be refreshed).

In one embodiment, the time $t_j$ includes the time required to execute the query of $v_j$ and to collect statistics on the results. An estimate of $t_j$ can result from first invoking the optimizer 308 to estimate the cost of executing $v_j$. An estimate of the time required to collect statistics can be added to the estimate time based on the number of columns in $v_j$, its estimated size, and the kind of required statistics (e.g., basic statistics, histograms, etc.).

It should be noted that estimating a value of $freq_j$ can be somewhat challenging since $freq_j$ by definition should consider all possible activity on the data during the life time of the workload 304. This activity can be due to data modification statements that are part of the workload 304, or other statements that are running concurrently with the workload 304. In one implementation, problems with calculating $freq_j$ can be avoided by permitting module 314 to calculate a cost of initially constructing and collecting statistics (i.e., assume $freq_j$ equals one and reduce equation 440 to $C(v_j)=t_j$).

The cost and benefit module 314 can compute costs using an actual benefit or an estimated benefit. When computing benefits, given a workload W, and given a statview v that can be used to optimize a query Q, module 314 can define/compute a metric that represents the importance, or the benefit of this statview to the workload at hand.

The most accurate and intuitive metric for measuring the benefit of a statview v to a query Q is the reduction in the execution cost of Q as a result of using v in the optimization. This benefit metric $B_0$ is shown as equation 422 of sample benefit equations 420. In equation 422, cost(Q) represents the actual execution cost of Q without taking v into consideration during optimization. Additionally, $cost_v(Q)$ represents the actual execution cost of Q when v is used to optimize Q. The benefit can be summed over all queries that can be optimized using v to come up with the benefit of v to the workload W.

Note that the difference in costs of equation 422 is primarily due to the change of execution plans triggered by the presence of more accurate statistics (i.e. the statview v). If the statistics provided by v are not significant enough to cause the optimizer to choose a different plan, then $cost(Q)=cost_v(Q)$, and $B_0(v;Q)=0$. An assumption used by module 314 when equation 422 is utilized is that if the plan has changed, the new plan is always better than the old one. This assumption is only true in certain situations, and code of module 314 can be adjusted to ensure that for a given implementation neither the assumption is always true (or the old plan is used instead of the new one) or that the new plan is better than the old one a statistically significant enough times to merit always applying the assumption.

It should be appreciated that computing $B_0(v;Q)$ using equation 422 can be expensive, since equation 422 requires: $v$ to be created and requires statistics on $v$ to be collected and requires Q to be optimized and executed twice, with and without $v$ present. If multiple statviews can be used to optimize the same query, that query has to be optimized and executed twice for each statview, which can be infeasible for a large workload with complex queries and large number of candidate statviews.

To avoid having to execute the query twice, one contemplated approach is to have module 314 estimate cost of the query instead of computing the actual cost. Use of an estimated cost, however, is not necessarily straight forward, since the estimated cost without the statview is computed based on incorrect statistics. The estimated cost without the statview is not often comparable to the estimated cost with the statview (as they are computed using different sets of statistics).

A main factor affecting the benefit of a statview $v$ in context of statview advisor 310 is the change of plans due to the presence of $v$. Based on this observation, module 314 can be configured to compute an approximate benefit metric as follows:

1. Optimize the query Q without $v$. Let P denote the chosen plan, and estcost(P; $v^1$) denote the estimated cost of P, computed using the "inaccurate" statistics (without $v$ or $v^1$).
2. Optimize Q again with $v$ present. Let $P_v$ denote the selected plan, and estcost($P_v$; $v$) denote the estimated cost of $P_v$, computed with $v$ present.
3. Obtain estcost(P; $v$), the cost of P $v^1$ computed with $v$ present. This value can be obtained during the same optimizer call.

Thus, module 314 can compute the benefit of $v$ to the query Q using equation 424.

Based upon equation 424, when the optimizer 308 chooses the same plan both times, then again $P=P_v$, and $B_1(v;Q)=0$. Note that $B_1(v;Q)$ does not equal $B_0(v;Q)$. However, $B_1$ increases monotonically with $B_0$. Assuming that it is highly unlikely for two different plans to have the exact same cost, having $B_0(v;Q)=0$ implies that the two plans are in fact the same, which implies that their estimated cost with the same set of statistics is the same, and thus $B_1(v;Q)=0$, and vice versa. A high $B_0$ value indicates that the alternative chosen plan $P_v$ is much better than chosen plan P. If we assume that all other statistics (not provided by $v$) are accurate enough, it should follow that estcost(P; $v$)>estcost($P_v$; $v$), which leads to a high $B_1$. Computing $B_1$ requires collecting $v$ and optimizing Q twice, thus eliminating the need to execute Q in order to recommend statviews.

Benefit estimation equation 424 ($B_1$) eliminates the need to actually execute the query. Using equation 424 still, however, requires that module 314 optimizes each query twice for each candidate statview 320, in addition to building the statview $v$ and collecting its statistics, which can be a computationally expensive process for a large number of potential candidate statviews. Thus, it can be desirable to create and utilize different equations (to either 422, or 424) to estimate the benefit. Specifically, a lighter weight benefit estimation computation, which still maintains a high level of accuracy, can be preferred.

One such equation can leverage the following insight. The change of plans due to the presence of a statview $v$ is mainly because of the error in estimating the size of $v$. So, if module 314 uses card($v$) to denote the actual cardinality of the result of $v$, and Card$_{est}$($v$) denotes the estimated cardinality using the base table statistics and the optimizer's assumptions. Then, Card Err($v$)=|Card($v$)−Card$_{est}$($v$)|. If the optimizer's estimate is close to the actual size of $v$, Card Err($v$) approximately equals 0, and the plan is not likely to change when $v$ is available during optimization. The larger the error becomes, the more likely the plan will change.

Note that the cardinality error alone is a characteristic of $v$ and does not capture the effect of $v$ on the query Q. This effect results from the propagation of Card$_{Err}$($v$) along the execution plan of Q. To account for this effect, module 314 can define RemOp($v$;Q) as the number of remaining operators (i.e. the operators in Q that are not already included in $v$). Module 314 can only consider the operators that have a significant impact on the cost of the query, such as blocking operators (e.g. join, sort, etc.). As the value of RemOp($v$;Q) increases, the error in $v$ propagates further, increasing the chance of choosing a different plan. Based on this observation, the benefit $B_2$ of $v$ to Q can be computed as equation 426.

Computing Card Err($v$) in equation 426 can require determining the actual cardinality of $v$, which can be obtained as follows:

1. By keeping samples of each base table. If $v$ involves a single table, the predicates in $v$ can be applied on the corresponding sample, thus estimating the selectivity of these predicates and the cardinality of $v$.
2. By maintaining join synopses of the base tables. If $v$ involves a set of tables that are covered by one of the available join synopses, the predicates of $v$ can be applied on that synopsis as in case 1.
3. If $v$ does not belong to either of these cases (i.e. $v$ involves multiple tables that are not covered by a join synopsis), then $v$ has to be executed on the original base tables, in order to get its accurate cardinality, since sampling is not distributive over joins.

In case 3 above, samples of base tables can be used to compute an estimate of Card Err($v$), denoted by CardErr$_{est}$($v$). Note that we are after an estimation of the error Card($v$)-Card Err($v$)|, not an estimation of the Card($v$) itself.

The view generalization module 316 is configured to examine the candidate statviews 320 and to generate additional candidates 320 by suggesting views that can be used by multiple queries some of which are similar to but may not be present in the workload 304. For each pair of candidate statistical views examined by module 316, a determination can be made as to whether one of them subsumes the other. If not, programmatic routines of module 316 can check whether it is possible to generate a statistical view 320 that subsumes both of the examined queries. A statview 320 subsumes another similar statview 320 if the view can provide at least the useful statistics provided by the other view.

In one embodiment, the view generalization module 316 can utilize the following test to determine view subsumption, allowing false negatives. $v_a$ subsumes $v_b$ if (but not only if) all these conditions hold:

1. $v_a$ and $v_b$ involve the same set of tables.
2. $v_a$ and $v_b$ have the same join predicates.
3. For each predicate of the form (exp relop const) in $v_b$, either: (a) the same predicate exists in $v_a$, or (b) $v_a$ has exp as one of its columns; and
4. Each predicate of the form (exp relop const) in $v_a$ must also exist in $v_b$.

In one embodiment, the view generalization module 316 can construct a graph structure where each node is a candidate view (e.g., a sample graph structure is shown as graph 460 of FIG. 4C). In a constructed graph structure, an edge from $v_i$ to $v_2$ can indicates that $v_1$ subsumes $v_2$. Module 316 can takes as input a set V of candidate views. Output of module 316 can include an updated set V (after adding more candidate views to it), as well as a set E of edges connecting the views in V.

An algorithm used by module 316 can starts by splitting V into separate groups. Each group $V_0$ can contain the views that involve the same set of tables and have the same join predicates between these tables. For a view v, T(v) denotes the set of tables referenced in v. Also, B(v) and C(v) denote the benefit and the cost of v, respectively. By splitting V into smaller sets, we insure satisfying the first 2 conditions for subsumption, and help reduce the number of pair-wise comparisons between views, since only views that belong to the same group are considered.

Within each group $V_0$, if a view $v_a$ subsumes another view $v_b$ (by satisfying the subsumption conditions above), the two corresponding nodes in the graph are linked with an edge. If not, the module checks whether these views can have a common subsumer, in which case this new view is added to the graph (if it does not already exist), and linked to the two views being compared. The cost of the subsumer is computed using module 314. If the cost of the subsumer is less than or equal to the cost of a subsumed view (within some error ±), the subsumed view is pruned (since its benefit/cost ratio is definitely less than that of the subsumer). The benefit of the subsuming view v is the sum of the benefits of all leaf views $v_i$ that are subsumed by v. A leaf view is a view that does not subsume any others. Module 316 can sum the benefit since any two leaf views with a common subsumer can never be matched with the same query (since they have the same set of tables but with different local predicates).

Module 316 can find a common subsumer as follows. For a view v, let Where(v) be the set of predicates in the WHERE clause of v, and Select(v) be the set of expressions in the SELECT clause of v. For an expressions, let Columns(s) be the set of columns referenced in that expression. For two views $v_1$ and $v_2$ (that belong to the same group), a common subsumer v is obtained as follows:
1. v involves the same set of tables as $v_1$ (or $v_2$);
2. the WHERE clause of v contains all predicates that exist in both $v_1$ and $v_2$ (if any);
3. the SELECT clause of v is initialized with the union of the SELECT clauses of $v_1$ and $v_2$; and
4. for a predicate of the form (exp relop const) in either $v_1$ or $v_2$ but not in both, exp is added to the SELECT clause of v.

To limit the possible number of generalized views, module 316 can generate a common subsumer for $v_1$ and $v_2$ only if they are similar enough. We consider two views to be similar if there is at most one different predicate between them.

As seen in the last step above, predicates that are not common in both views are moved to the SELECT clause of the subsumer. In order not to sacrifice accuracy, it is important to collect histogram information on these expressions. If more than one such expression is present, then a multi-dimensional histogram may be needed. Since multi-dimensional histograms are currently not supported in many DBMSs, module 316 can decided to limit the number of different predicates to one. If the common subsumer of two views involves only one table, has no predicates, and all the expressions in its SELECT clause are single columns (not complex expressions), the algorithm decides that these two views have no common subsumer. Any statistics on this potential subsumer can be obtained directly from the base table.

It should be noted that view generalization can be performed without any loss in the quality of the obtained statistics, hence the benefit of the subsumer equals the sum of benefits of the subsumed leaf views. The common expression added to the SELECT clause of the subsumer is accompanied by the recommendation to collect a histogram on that expression. Generally speaking, information obtained from the histogram can be less accurate than that obtained from the subsumed views (due to interpolation within the buckets of the histogram). However, we overcome this problem by specifically constructing the histogram such that the values in the subsumed statviews lie on bucket boundaries in the histogram, thus no interpolation is required, and accuracy is retained.

Views $V_1$, $V_2$, and $V_3$ of sample 450 are used to illustrate a use of view generalization module 316. The benefits of each of the views are as shown in graph 460 in section (a). By examining v1 and v2, module 316 can generate the generalized view $v_{12}$. This new view is linked to the original views as shown in (b) of graph 460. The benefit of $v_{12}$ can be computed as the sum of the leaf nodes that it subsumes ($v_1$ and $v_2$), which is a benefit value of 50, as shown. Further processing by the module 316 can result in a generation of generalized view $V_{13}$, shown in graph section (c).

The view selection module 318 can be configured to choose a subset of the candidate statviews 320 that maximizes the benefit/cost ratio while satisfying any existent predefined constraints, such as a maximum number of statviews constraint and/or a constraint imposing a maximum cost of collecting statistics on the recommended views. The view selection module 318 can be responsible for filtering the candidate list and coming up with the final recommendations 306. The recommended views are selected based on their benefit/cost ratio. Module 318 can be biased to recommend views that do not provide the same statistics, in order to cover as much of the required statistics as possible while still satisfying the imposed constraints.

In one embodiment, view selection performed by module 318 can be of exponential complexity. Module 318 can use a greedy algorithm that has a polynomial running time in the number of candidate views. The module 318 can accept as input the set of candidate views V, the set of edges E, as well as possible constraints on the maximum number of views to recommend ($n_{max}$) and/or the maximum cost of the recommended views ($c_{max}$). The output of module 318 can comprise the set R of final recommendations, where R is a subset of V.

At each iteration, the module 318 can greedily look for the view v that has the highest benefit/cost ratio (bcr(v)=B(v)/C(v)), and can still fit within the cost constraint (if any). The algorithm terminates if no such view is found, if the maximum number of views have been recommended, or if there are no more views to consider. If such view is found, it is added to the set R and the total current cost is updated. The algorithm updates the benefit of the overlapping views. If the recommended view v is a leaf view (i.e. does not subsume any other views), the benefits of all its subsumers are decremented by the benefit of v itself. If v subsumes some other leaf views, the benefit of these subsumed leaf views is set to zero, and the benefits of their subsumers is decremented accordingly.

This can be illustrated by graph 465 of FIG. 4C. Graph 465 is an extension of graph 460, where costs of each view have been added, as shown. Among all the candidate views, v3 has the highest benefit/cost ratio. Therefore, v3 is added to the final recommendations. However, since it is a leaf view, its subsumer (v13) gets its benefit decremented, as shown in section (b) of graph 465. The rationale is that the benefit of $v_{13}$ should not include that of $v_3$ anymore since the latter has been already covered. Based on the new benefit values, v12 has the highest benefit/cost ratio. Since this view covers $v_1$ and $v_2$, their respective benefits are set to zero. This update is propagated upwards to all their subsumers, as shown in FIG. 4(c). Now, the remaining views all have a benefit of zero, which is logical since $v_{12}$ and $v_3$ cover all the required statistics. Thus, no more views are needed.

It should be appreciated that FIGS. 4A-C are presented for illustrative purposes only and specifics can vary, yet still be considered within the scope of the contemplated invention. For example, equations 420, 440 can be modified in any manner, so long as relatively accurate cost/benefit metrics are obtained. Further, the graph structure used by modules 316 and 318 and shown in graphs 460, 465 is not to be construed as an inventive constraint, but instead as one contemplated implementation choice. Any adaption permitting views to be generalized and/or selected should be considered within the scope of the contemplated invention.

The diagrams in FIGS. 1-4 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for recommending statistical views comprising:
identifying a workload to be handled by a database system, wherein said workload comprises at least one query that the database system is to handle;
enumerating a set of at least one candidate statistical views (statviews) to be utilized when optimizing the workload;
computing a benefit value of the each of the enumerated candidate statistical views relative to the entire workload;
computing a cost value for each of the enumerated candidate statistical views, wherein the cost value reflects a cost of constructing and collecting statistics on the associated statistical view;
for each of the enumerated candidate statistical views, when the computed cost value is greater than the computed benefit value, excluding that enumerated candidate statistical view from a determined set of candidate views;
for each of the enumerated candidate statistical views, when the computed cost value is less than the computed benefit value, adding that enumerated candidate statistical view to the determined set of candidate views; and
recommending the determined set of candidate views.

2. The method of claim 1, further comprising:
identifying a configurable constraint for a maximum number of views to recommend;
identifying a configurable constraint for a maximum cost of collecting statistics on the recommended views; and
filtering the determined set of candidate views so that a quantity of candidate views in the set does not exceed the maximum number of views constraint and so that a cost of collecting statistics on the candidate views in the filtered set does not exceed the maximum cost of collecting statistics constraint.

3. The method of claim 1, further comprising:
creating at least one additional candidate statistical views during a generalization phase executed after the enumerating occurs and before the determining of the set of candidate views occurs, wherein each of the created additional candidate statistical views subsumes at least two other candidate statistical views.

4. A computer program product for recommending statistical views comprising:
a computer readable storage medium, which is a computer readable memory having computer usable program code stored therewith, the computer usable program code comprising:
computer usable program code to identify a workload to be handled by a database system, wherein said workload comprises at least one query that the database system is to handle;
computer usable program code to enumerate a set of at least one candidate statistical views (statviews) to be utilized when optimizing the workload;
computer usable program code to compute a benefit value of the each of the enumerated candidate statistical views relative to the entire workload;
computer usable program code to compute a cost value for each of the enumerated candidate statistical views, wherein the cost value reflects a cost of constructing and collecting statistics on the associated statistical view;
computer usable program code to, for each of the enumerated candidate statistical views, when the computed cost value is greater than the computed benefit value, exclude that enumerated candidate statistical view from a determined set of candidate views;
computer usable program code to, for each of the enumerated candidate statistical views, when the computed cost value is less than the computed benefit value, add that enumerated candidate statistical view to the determined set of candidate views: and computer usable program code to recommend the determined set of candidate views.

5. The computer program product of claim 4, the computer usable program code further comprising:

computer usable program code to identify a configurable constraint for a maximum number of views to recommend;

computer usable program code to identify a configurable constraint for a maximum cost of collecting statistics on the recommended views; and computer usable program code to filter the determined set of candidate views so that a quantity of candidate views in the set does not exceed the maximum number of views constraint and so that a cost of collecting statistics on the candidate views in the filtered set does not exceed the maximum cost of collecting statistics constraint.

6. The computer program product of claim 4, the computer usable program code further comprising:

computer usable program code to create at least one additional candidate statistical views during a generalization phase executed after the enumerating occurs and before the determining of the set of candidate views occurs, wherein each of the created additional candidate statistical views subsumes at least two other candidate statistical views.

7. A database management system comprising:

an optimizer comprising a computer program product executable by a processor and stored in a computer readable storage medium that calculates a cost of query paths using at least one statistical views; and a statistical view advisor comprising a computer program product executable by a processor and stored in a computer readable storage medium configured to automatically generate the statistical views used by the optimizer, wherein said statistical view advisor is configured to:

identify a workload to be handled by a database system, wherein said workload comprises at least one query that the database system is to handle;

enumerate a set of at least one candidate statistical views (statviews) to be utilized when optimizing the workload;

compute a benefit value of the each of the enumerated candidate statistical views relative to the entire workload;

compute a cost value for each of the enumerated candidate statistical views, wherein the cost value reflects a cost of constructing and collecting statistics on the associated statistical view;

for each of the enumerated candidate statistical views, when the computed cost value is greater than the computed benefit value, exclude that enumerated candidate statistical view from a determined set of candidate views;

for each of the enumerated candidate statistical views, when the computed cost value is less than the computed benefit value, add that enumerated candidate statistical view to the determined set of candidate views; and recommend the determined set of candidate views.

8. The database management system of claim 7, wherein said statistical advisor is further configured to:

identify a configurable constraint for a maximum number of views to recommend;

identify a configurable constraint for a maximum cost of collecting statistics on the recommended views; and filter the determined set of candidate views so that a quantity of candidate views in the set does not exceed the maximum number of views constraint and so that a cost of collecting statistics on the candidate views in the filtered set does not exceed the maximum cost of collecting statistics constraint.

9. The database management system of claim 7, wherein said statistical advisor is further configured to:

create at least one additional candidate statistical views during a generalization phase executed after the enumerating occurs and before the determining of the set of candidate views occurs, wherein each of the created additional candidate statistical views subsumes at least two other candidate statistical views.

\* \* \* \* \*